US007225257B2

(12) United States Patent
Aoike et al.

(10) Patent No.: US 7,225,257 B2
(45) Date of Patent: May 29, 2007

(54) INFORMATION-DISPLAY SYSTEM, AN INFORMATION-DISPLAY METHOD, AN INFORMATION-DISPLAY SERVER, AND AN INFORMATION-DISPLAY PROGRAM

(75) Inventors: Kunio Aoike, Tokyo (JP); Hideki Kogami, Tokyo (JP); Yoshio Kuniyoshi, Tokyo (JP); Eiji Yoshino, c/o Ricoh Company, Ltd. 3-6, Nakamagome 1-chome, Ohta-ku, Tokyo 143-8555 (JP)

(73) Assignees: Ricoh Company, Ltd., Tokyo (JP); Ricoh System Kaihatsu Co., Ltd., Tokyo (JP); Eiji Yoshino, Tokyo (JP)

( * ) Notice: Subject to any disclaimer, the term of this patent is extended or adjusted under 35 U.S.C. 154(b) by 651 days.

(21) Appl. No.: 10/098,295

(22) Filed: Mar. 18, 2002

(65) Prior Publication Data

US 2002/0133544 A1 Sep. 19, 2002

(30) Foreign Application Priority Data

Mar. 19, 2001 (JP) ............................ 2001-079474

(51) Int. Cl.
*G06F 15/173* (2006.01)
*G06F 15/16* (2006.01)

(52) U.S. Cl. ...................... 709/225; 709/203; 709/206; 709/223

(58) Field of Classification Search ................ 709/201, 709/227, 229, 242, 244, 203, 206, 223, 225
See application file for complete search history.

(56) References Cited

U.S. PATENT DOCUMENTS 4,908,853 A * 3/1990 Matsumoto ............ 379/355.09
5,005,013 A 4/1991 Tsukamoto et al.
5,128,981 A * 7/1992 Tsukamoto et al. ......... 455/450
5,323,314 A * 6/1994 Baber et al. .................... 705/8
5,588,009 A 12/1996 Will
5,701,458 A * 12/1997 Bsaibes et al. ................ 707/9
5,790,974 A * 8/1998 Tognazzini .............. 455/456.5
5,867,646 A * 2/1999 Benson et al. ................. 726/4
5,941,947 A * 8/1999 Brown et al. ............... 709/225
6,088,717 A * 7/2000 Reed et al. ................. 709/201
6,163,799 A * 12/2000 Kambayashi et al. ....... 709/204
6,266,773 B1 * 7/2001 Kisor et al. .................... 726/17
6,289,458 B1 * 9/2001 Garg et al. .................... 726/21
6,640,230 B1 * 10/2003 Alexander et al. ............ 707/10
6,677,968 B1 * 1/2004 Appelman .................. 715/853

(Continued)

FOREIGN PATENT DOCUMENTS

JP 08-088843 4/1996
JP 10207938 A 8/1998

*Primary Examiner*—Rupal Dharia
*Assistant Examiner*—Kristie Shingles
(74) *Attorney, Agent, or Firm*—Morrison & Foerster LLP

(57) ABSTRACT

An information-display system, an information-display method, an information-display server and an information-display program are provided that enable updating of a presence status on a real time basis without useless accesses, while facilitating changes of the kind of information to be displayed and facilitating improvements. The information-display system includes information display terminals and an information-display server, wherein the server transmits a notice to the terminals indicating that there is an update, and then, the terminals acquire and display the updated information.

7 Claims, 16 Drawing Sheets

U.S. PATENT DOCUMENTS

| | | | | |
|---|---|---|---|---|
| 6,714,519 | B2 * | 3/2004 | Luzzatti et al. | 370/252 |
| 6,747,970 | B1 * | 6/2004 | Lamb et al. | 370/352 |
| 6,791,583 | B2 * | 9/2004 | Tang et al. | 715/751 |
| 6,865,268 | B1 * | 3/2005 | Matthews et al. | 379/265.09 |
| 6,865,385 | B1 * | 3/2005 | Kohda et al. | 455/414.1 |
| 6,870,927 | B1 * | 3/2005 | Theis | 379/355.01 |
| 6,895,558 | B1 * | 5/2005 | Loveland | 715/746 |
| 6,954,220 | B1 * | 10/2005 | Bowman-Amuah | 715/741 |
| 6,956,848 | B1 * | 10/2005 | Keung et al. | 370/356 |
| 2002/0035605 | A1 * | 3/2002 | McDowell et al. | 709/206 |
| 2002/0055967 | A1 * | 5/2002 | Coussement | 709/202 |
| 2002/0055975 | A1 * | 5/2002 | Petrovykh | 709/205 |
| 2002/0085701 | A1 * | 7/2002 | Parsons et al. | 379/211.01 |
| 2003/0046296 | A1 * | 3/2003 | Doss et al. | 707/102 |
| 2005/0102287 | A1 * | 5/2005 | Poole | 707/9 |

* cited by examiner

FIG.13

(a)

| DEPARTMENT NAME | NUMBER OF LINES | NUMBER OF COLUMNS | ... |
|---|---|---|---|
| : | : | : | : |

(b)

| NAME LABEL ID | CLASSIFICATION | TITLE | NAME | USER ID | PASSWORD | NAME LABEL LINK | PRESENCE STATUS | ... |
|---|---|---|---|---|---|---|---|---|
| : | : | : | : | : | : | : | : | : |

(c)

| STATUS | COLOR | ... |
|---|---|---|
| : | : | : |

80

81

INFORMATION-DISPLAY SYSTEM, AN INFORMATION-DISPLAY METHOD, AN INFORMATION-DISPLAY SERVER, AND AN INFORMATION-DISPLAY PROGRAM

BACKGROUND OF THE INVENTION

1. Field of the Invention

The present invention generally relates to an information-display system, an information-display method, an information-display server and an information-display program, and especially relates to an information-display system, an information-display method, an information-display server, and an information-display program, which are for displaying information stored in the information display-server on an information-display terminal.

2. Description of the Related Art

In government and municipal offices, and corporations, for example, systems have been introduced to display presence status of predetermined persons (a minister, a director general, a president, a managing director, and the like) in order to perform business smoothly.

In one of the conventional presence status display systems, presence status of a predetermined person or persons is displayed by arranging a nameplate bearing identification, such as a name, a title and the like, of each of the predetermined persons, and by back-lighting the nameplate through turning on and turning off an electric bulb in the back of the nameplate. Often, ON and OFF operations of the electric bulb, etc., are performed by a switch provided in the vicinity of an office of the predetermined persons.

In another conventional presence status display system, a person's presence status is shown on a display apparatus by using a computer, a presence status management server and LAN (Local Area Network).

In the conventional presence status display systems such as above, replacement of electric bulbs etc. is necessary whenever the electric bulb etc. is damaged, and further, if presence status displays are provided at a large number of locations, maintenance and management are serious problems.

Another problem with the conventional presence status display systems is that the displays have to be modified or replaced due to increase in the number of persons whose presence status is to be shown. The problem gets more serious as the number of display locations gets greater.

Further, the conventional presence status display has a problem of taking great time and effort, when location of a person whose presence status is to be displayed moves, requiring changes in wiring between presence status displays and a switch. The greater the number of display locations, the more serious the problem is.

In another conventional presence status display system that uses a computer for displaying presence status, it is necessary to reinstall a program every time an improvement to the presence status display system is implemented. This problem is serious when the number of the computers with the presence status display facility is great.

In another conventional presence status display system, updating the presence status information requires periodic and repeated access to the presence status management server that manages the presence status. This adds to traffic in the network, especially when the updating is performed in real time.

SUMMARY OF THE INVENTION

It is a general object of the present invention to provide a system, a method, a server and a program for displaying presence status of persons, which substantially obviate one or more of the problems caused by the limitations and disadvantages of the related art.

Features and advantages of the present invention will be set forth in the description that follows, and in part will become apparent from the description and the accompanying drawings, or may be learned by practice of the invention according to the teachings provided in the description. Objects as well as other features and advantages of the present invention will be realized and attained by the system, the method, the server and the program particularly pointed out in the specification in such full, clear, concise, and exact terms as to enable a person having ordinary skill in the art to practice the invention.

To achieve these and other advantages and in accordance with the purpose of the invention, as embodied and broadly described herein, the present invention made in view of the points described above provides the information-display system, the information-display method, the information-display server, and the information-display program, which enable real time updating of the presence status displayed on a presence status display without requiring useless accesses to the network, facilitating changes of information to be displayed on an information-display terminal, maintenance, management, and improvements.

In order to achieve the objective, the present invention provides an information-display system that displays information using one or more information-display terminals and an information-display server connected to the information-display terminals through a network, wherein the information-display server includes an information storing means to store the information to be displayed on the information-display terminals, and an update notice information transmitting means to provide a notice that information stored in the information storing means has been updated to the information-display terminals when there is an update, and wherein the information-display terminals include an information acquisition and display means to acquire the updated information from the information-display server when there is an update, and to display the updated information.

In an information-display system such as above, the notice that there is an update of the information stored in the information storing means is transmitted to the information-display terminals, and in response thereto, the information-display terminals can acquire the updated information from the information-display server. That is, since the information-display terminals access the information-display server only when there is an update of the information stored in the information storing means, network traffic is mitigated. As above, the information-display terminals can display current information in real time as the information stored in the information storing means is updated.

Further, since the information storing means stores the information to be displayed on the information-display terminals, the kind of information displayed on an information-display terminal can be changed easily. In addition, maintenance and management become easy by structuring the information-display system with an information-display server and one or more information-display terminals connected to the network.

In the present invention, each information-display terminal further includes a status updating demanding means by which an information-display terminal issues a demand for updating information stored in the information-display server, and the information-display server further includes an information updating means by which the information stored in the information storing means is updated according to the demand from the information-display terminal.

In an information-display system such as above, the information stored in the information storing means can be updated according to the status updating demand from an information-display terminal. In addition, when the information stored in the information storing means is updated, the information-display server will transmit a notice that there is an update to all the information-display terminals. Therefore, the information-display terminals can be updated on a real time basis according to the updated information.

In the present invention, the information indicates a status of one or more persons, and the status of the person or persons is displayed on an information-display terminal.

In the information-display system such as above, a status of the person or persons can be displayed on an information-display terminal.

The information storing means of the present invention contains at least personal information, such as name and title of the person or persons to be displayed, status information relative to one or more persons to be displayed, and one or more sets of layout information for displaying the personal information and the status information of the one or more persons to be displayed on the information-display terminals.

In the information-display system as above, display layout for displaying the personal information and the status information of one or more persons can be easily modified by providing one or more sets of layout information. By using the layout information, displaying a status of one or more persons selected by predetermined criteria is available.

The information-display terminal of the present invention displays the personal information and the status information of one or more persons in a selected display area that is prepared for every person, and the area can be colored according to the status information.

In the information-display system such as above, the status information is displayed in an area assigned to each person, and the area is illuminated in different colors according to the status information such that visual distinction of the status is facilitated.

The information of the present invention includes the status information that indicates at least presence or absence of the one or more persons to be displayed.

In the information-display system such as above, at least the status information indicating presence or absence of the one or more persons can be displayed on the information-display terminals.

The present invention includes an information-display method for displaying information using one or more information-display terminals and an information-display server connected to the information-display terminals through a network, wherein step for transmitting information indicating that there is an update from the information-display server to the information-display terminals in response to updating of information stored in the information storing means, and step for acquiring the updated information from the information storing means according to the information indicating that there is an update as received from the information display server, and displaying the updated information are included.

By the information-display method such as above, the information that there is an update can be transmitted to the information-display terminals, which can acquire the updated information from the information-display server. That is, since the information-display terminals access the information-display server only when there is an update of the information stored in the information storing means, network traffic is mitigated. As above, the information-display terminals can update the information to be displayed on a real time basis as the information stored in the information storing means is updated.

The present invention includes an information-display server that provides current information to information-display terminals connected through a network. The information-display server includes an information storing means for storing information to be displayed on the information-display terminals, an update notice transmitting means to transmit a notice indicating that there is an update of the information to all the information-display terminals pursuant to updating of the information stored in the information storing means, and an updated information transmitting means to transmit the information updated by an information-display terminal through a status updating demand.

An information-display server such as above transmits the update notice to all the information-display terminals pursuant to updating of the information stored in the information storing means, and transmits the information updated by an information-display terminal through the status updating demand to the information-display terminals. That is, the information-display terminal can display updated information on a real time basis by the updated information stored in the information storing means being provided to the information-display terminals.

In the present invention, an information display server provides the information storing means for storing the information to be displayed on one or more information-display terminals connected through a network, the update notice transmitting means for transmitting a notice indicating that there is an update to all the information-display terminals when the information stored in the information storing means is updated, and the updated information transmitting means for transmitting the information updated by an information-display terminal through the status updating demand such that the updated information is displayed on the information-display terminals.

BRIEF DESCRIPTION OF THE DRAWINGS

FIG. 13 is a block diagram of an example of databases that a DB server includes of the present invention;

DESCRIPTION OF THE PREFERRED EMBODIMENTS

In the following, embodiments of the present invention will be described with reference to the accompanying drawings.

Figure 1:
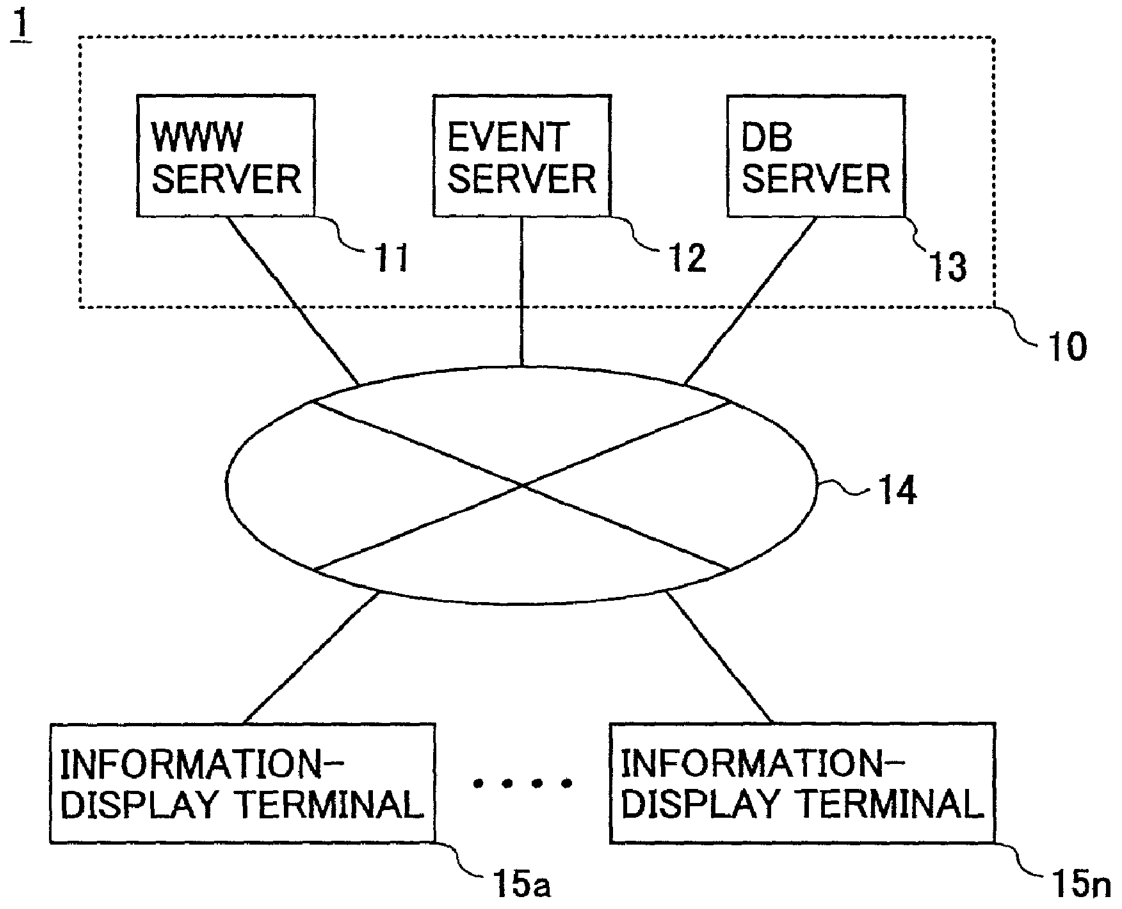
FIG. 1 is a block diagram of an embodiment of an information-display system of the present invention.

FIG. 1 shows a block diagram of an example of an embodiment of an information-display system of the present invention. The information-display system 1 of FIG. 1 includes a WWW (World Wide Web) server 11, an event server 12, a DB (Database) server 13, information-display terminals 15*a*–15*n*, which are connected via a network 14 such as the Internet. Here, the WWW server 11, the event server 12, and the DB server 13 can be installed in one cabinet, structuring an information-display server 10. Alternatively, the WWW server 11 and the event server 12 can be installed in one cabinet.

The WWW server 11 receives a processing demand such as a display data demand from a browser of the information-display terminals 15*a*–15*n*, and transmits the data to the information-display terminals 15*a*–15*n* according to the processing demand received. Further, the WWW server 11 stores various software that is automatically downloaded to and executed by the browsers of the information-display terminals 15*a*–15*n*, such as an applet, according to a demand from a browser of the information-display terminals 15*a*–15*n*.

The event server 12 transmits a notice to all the information-display terminals 15*a*–15*n*, indicating that there is an update according to an update notice issuing demand from the WWW server 11. The DB server 13 stores information relative to persons whose presence status is to be displayed, information relative to the presence status of the persons, information relative to display layout for various departments, and the like, which are required for operation of the information-display system 1.

Each of the information-display terminals 15*a*–15*n* includes a browser for displaying Web pages stored in the WWW server 11, which, for example, displays data received from the WWW server 11, and demands an update of data stored in the DB server 13. Alternatively, only one of the information-display terminals 15*a*–15*n* may display information based on the data received from the WWW server 11, and demand an update of the data and the like stored in the DB server 13.

Operators of the information-display terminals 15*a*–15*n* can demand update and the like of the data stored in the DB server 13 within authorized limits mentioned later, while being able to peruse a presence status of a department, for example, as desired. Further, the operators of the information-display terminals 15*a*–15*n* can update a presence status of every person whose presence status is to be displayed within the authorized limits.

Programs used by the WWW server 11, the event server 12, and the DB server 13 are installed from recording media of various types, such as a recording medium that stores information optically, electrically, or magnetically, like CD-ROM, a floppy disk, or a magneto-optic disk (MO), or a semiconductor memory that stores information electrically like ROM and a flash memory.

Figure 2:
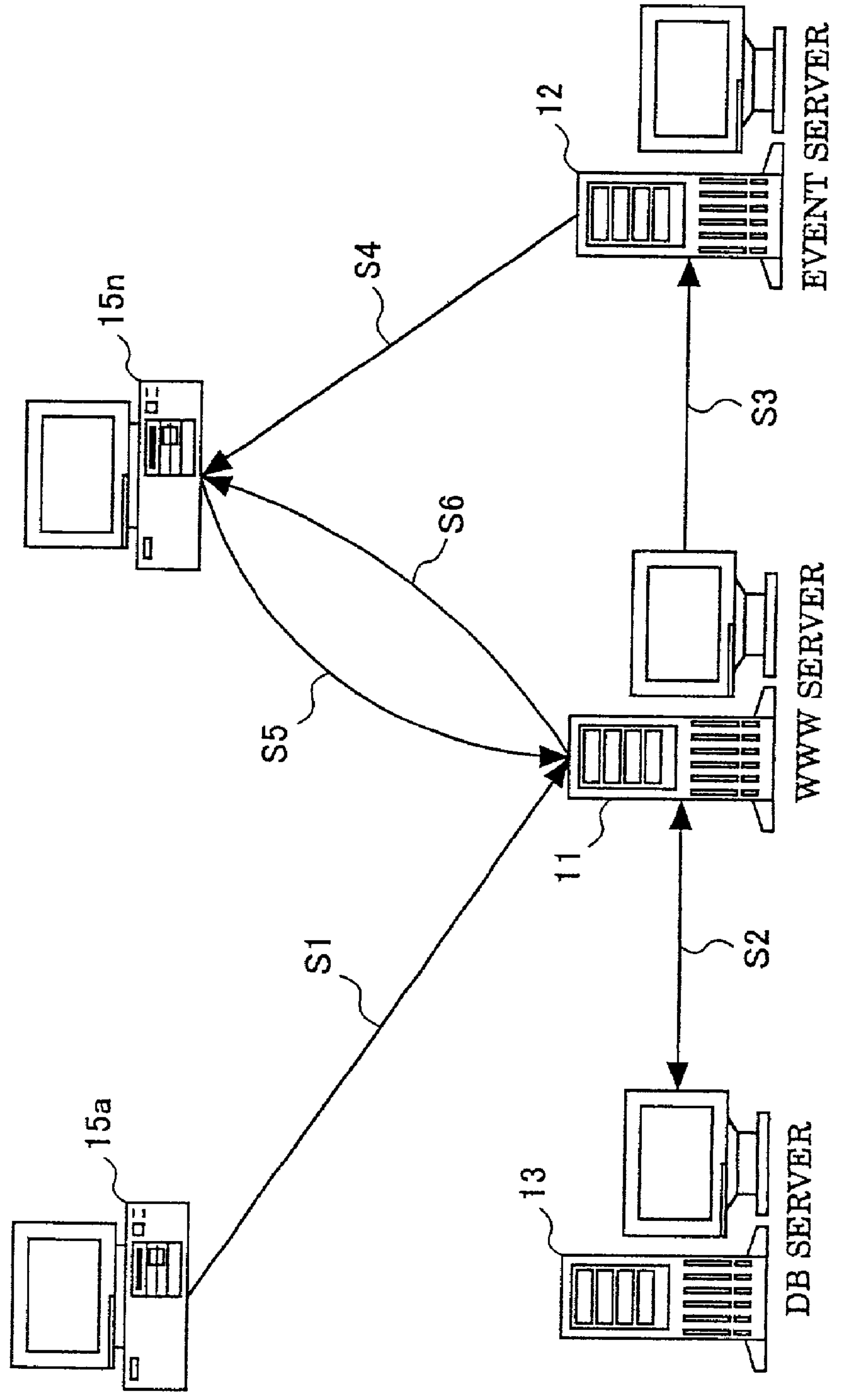
FIG. 2 is a figure explaining an outline of processing of the information-display system of the present invention.

Next, an outline about processing of the present invention is described, referring to a flowchart of FIG. 2. FIG. 2 explains the outline of processing of the information-display system of the present invention. In FIG. 2, processing based on a status updating demand is described as an example of processing of the information-display system 1.

At step S1 in FIG. 2, a presence status updating demand is transmitted to the WWW server 11 from information-display terminal 15*a* and the like which an operator operates. For example, the presence status updating demand is transmitted as an HTTP request from the browser of the information-display terminal 15*a* to the WWW server 11.

Progressing to step S2 following step S1, WWW server 11 performs a presence status updating process according to the presence status updating demand received. For example, the WWW server 11 searches the DB server 13 for a presence status of a person corresponding to the presence status updating demand received, and updates the presence status of the person according to the presence status updating demand.

Progressing to step S3 following step S2, the WWW server 11 directs the event server 12 to transmit a notice that there is an update in a presence status. Following step S3, the process progresses to step S4 wherein the event server 12 transmits the notice that there is an update in a presence status to all the information-display terminals 15*a*–15*n* according to the direction to transmit from the WWW server 11. The notice that there is an update in the presence status, which is transmitted from the event server 12 is received by an applet that is executed by the information-display terminal 15*n*, for example. The applet demands a browser to acquire a presence status according to the notice that there is an update in the presence status, which is received.

Following step S4, the process progresses to step S5 wherein the browser of the information-display terminal 15*n*, for example, performs presence status demand processing. Specifically, the browser of the information-display terminal 15*n* transmits an HTTP request for acquiring the updated presence status to the WWW server 11. Following step S5, the process progresses to step S6 wherein the WWW server 11 transmits the updated presence status to the information-display terminal 15*n*, for example, according to the presence status demand. For example, the WWW server 11 transmits the updated presence status to the information-display terminal 15*n* as an HTTP response to the HTTP request.

As shown in FIG. 2, in the information-display system 1 of the present invention, when the data stored in the DB server 13 is updated, a notice that there is an update of a presence status is provided to all the information-display terminals 15*a*–15*n* from the event server 12. Then, the information-display terminals 15*a*–15*n*, upon receiving the notice that there is an update of a presence status from the event server 12, acquire the updated presence status from the WWW server 11 and display the updated presence status.

That is, the information that the information-display terminals 15*a*–15*n* display is updated not by "pulling" activated by the browser, but by "pushing" the notice that there is an update of a presence status from the event server 12. Therefore, the display of the information-display terminals 15*a*–15*n* can reflect updated data stored in the DB server 13 on a real time basis.

Figure 3:
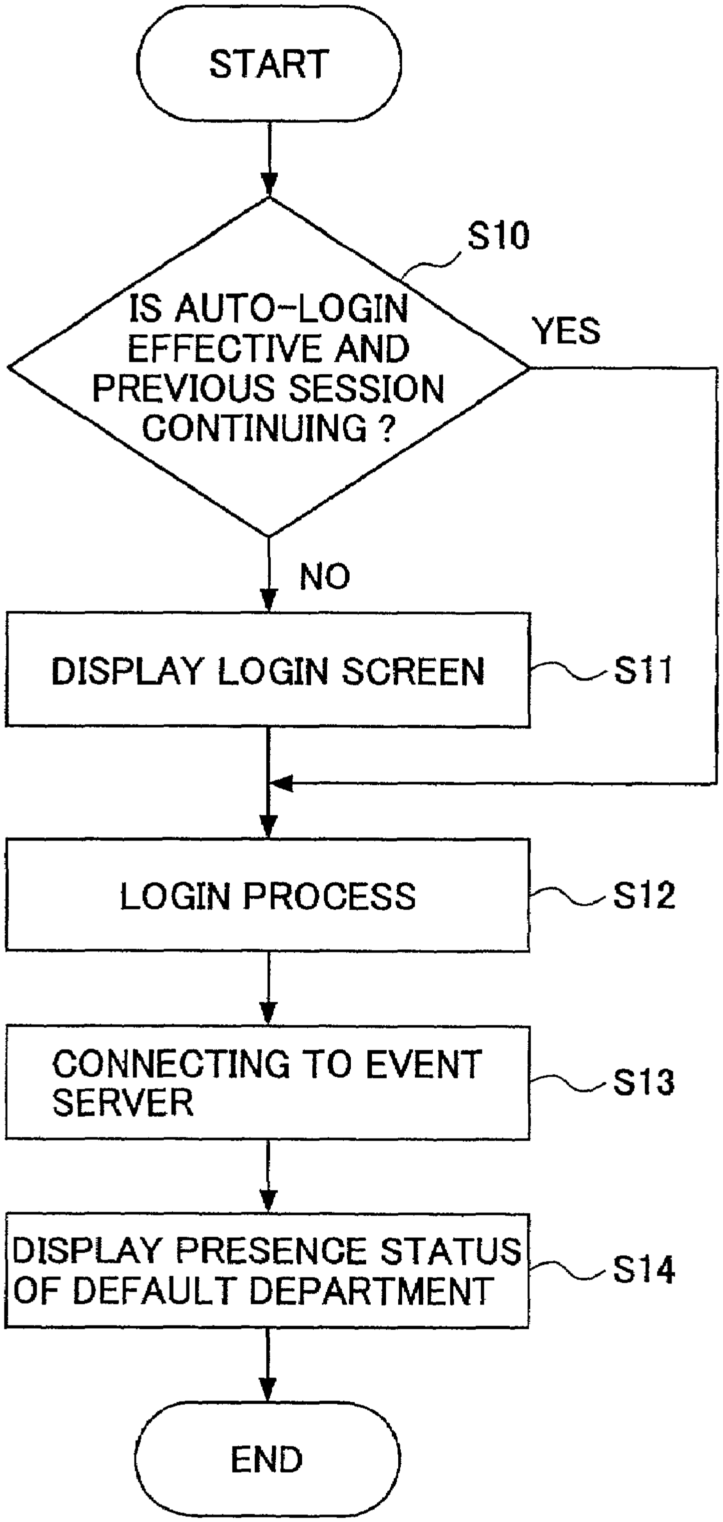
FIG. 3 is a flowchart of an example of starting processing of the information-display terminal of the present invention.

Details of processing of the present invention are explained hereafter. FIG. 3 shows a flowchart of an example of starting processing of an information-display terminal. For example, if the information-display terminal 15*a* is started by an operator, the process progresses to step S10 and the information-display terminal 15*a* determines whether or not an auto-login function is effective and whether a previous session has not been logged out. Here, the auto-login is a function that dispenses with inputting user ID and a password, which are required only at a first login, when the same information-display terminal is started for a second time and henceforth.

If it determined that the auto-login is effective and the previous session has not been logged out (YES at S10), the process progresses to step S12, without the information-display terminal 15*a* repeatedly inputting the user ID and the password. If it is not determined that auto-login is effective and the previous session has not been logged out (NO at S10), the process of the information-display terminal 15*a* progresses to step S11.

The information-display terminal 15*a* displays a login screen received from the WWW server 11 at step S11. Blanks are provided in the screen for inputting a user ID and a password. When the operator of the information-display terminal 15*a* fills the user ID and the password in the blanks of the login screen, the process of the information-display terminal 15*a* progresses to step S12.

At step S12, the information-display terminal 15*a* transmits to the WWW server 11 the user ID and the password, which were inputted into the login screen. Here, in the information-display system 1, operators are categorized as a viewer, a receptionist, a switcher, a general affairs person, and a user, and different access permissions are assigned, respectively.

An example of the access permissions follows. The viewer is allowed to peruse a presence status. The receptionist is allowed to peruse and update "absence (out of building)" and "presence (in the building)" of persons whose presence status is to be displayed. The switcher is allowed to update a more comprehensive presence status, namely, "absence (out of the building)", "presence (in the building)", "out of office", "in a conference", "in a meeting" and the like.

In addition to the access permission of the switcher, the general affairs person is allowed to edit information about persons whose presence status is to be displayed, and also to edit information required for operation of the information-display system 1. A user is allowed to peruse and update presence status of one or more specific persons whose presence status, such as "absence (out of the building)", "presence (in the building)", "out of office", "in a conference", "in a meeting" and the like, is to be displayed.

By categorizing the operators into a viewer, a receptionist, a switcher, a general affairs person, and a user, and by setting up different access permissions in this manner, different sets of functions of the information-display system 1 can be assigned to each category. In addition to the viewer, the receptionist, the switcher, the general affairs person, and the user, access permission may be defined for a manager who maintains the information-display system 1.

If login is successful, the process progresses to step S13 following step S12, and the information-display terminal 15*a* is connected to the event server 12. In addition, when the login fails, while displaying the fact of the failed login on the information-display terminal 15*a*, the login screen may be displayed again.

Figure 4:
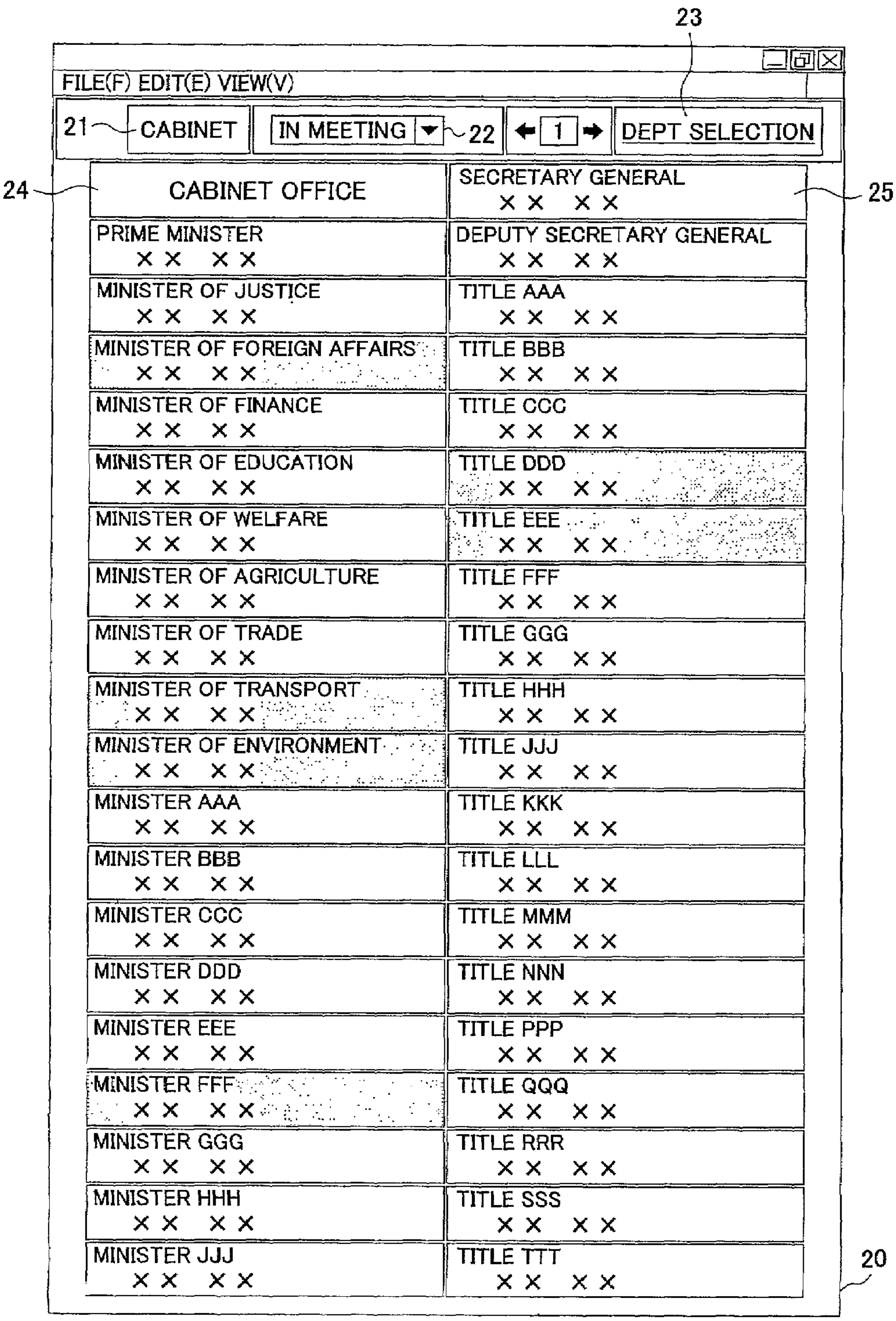
FIG. 4 is an example of a presence status screen of the present invention.

Progressing to step S14 following step S13, the information-display terminal 15*a* receives and displays a default screen from the WWW server 11 according to the access permission of an operator. For example, the information-display terminal 15*a* displays a presence status screen as shown in FIG. 4, showing the presence status of a default set of the persons to be displayed. Here, the information-display terminal 15*a* may be structured such that a set of persons to be displayed in a previous session is saved for customizing the presence status display screen, without requiring the WWW server 11 to prepare an individual configuration for each of the information-display terminals 15*a*–15*n*.

FIG. 4 shows an example of the presence status screen. The presence status screen 20 of FIG. 4 includes a department name box 21, a presence status box 22, a department selection link 23, a label 24, and a name label 25. The department name box 21 indicates a name of a department of persons whose presence status is displayed on the presence status screen 20. The presence status box 22 displays a presence status of a selected name label, according to the access permission of the operator of the information-display terminal 15*a*, for example. The presence status of the selected name label can be updated by changing the presence status of the presence status box 22.

Figure 5:
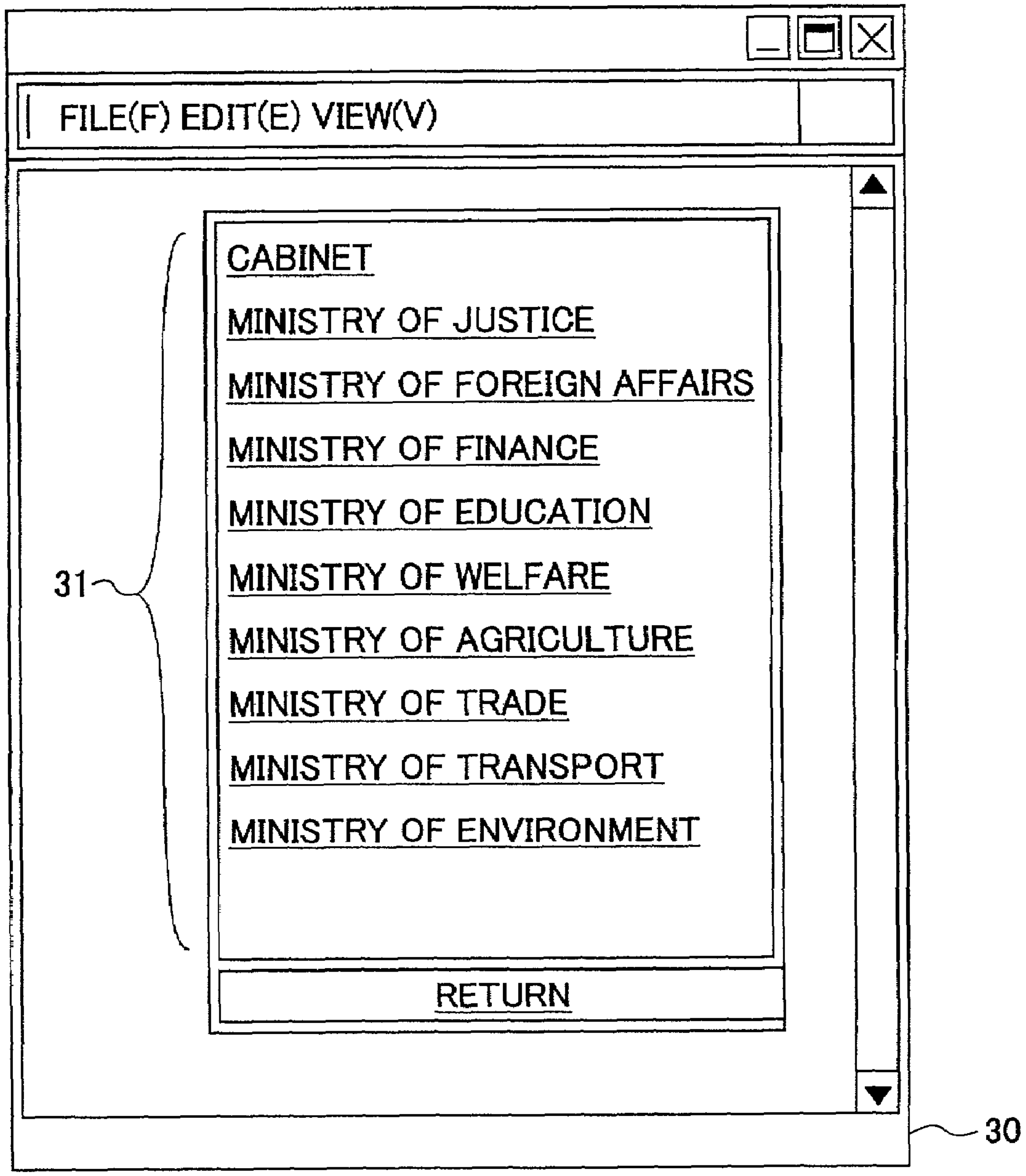
FIG. 5 is an example of a department menu screen of the present invention.

The department selection link 23 is a link for displaying a department menu screen as shown in FIG. 5, through which a presence status of a selected department is displayed. FIG. 5 shows an example of the department menu screen. The department menu screen 30 of FIG. 5 includes a department name link box 31. The department name link box 31 includes one or more department name links. By selecting a department name link, a presence status screen of the selected department is displayed.

The label 24 displays a section name and the like, registered as a label. The label 24 does not react to updating operation of a presence status, but is displayed in a fixed background color (for example, yellow). The name label 25 displays title and name of the persons whose presence status is displayed, and background color of the name label changes according to the persons' presence status.

The presence status can be displayed with a colored background so that a visual distinction is facilitated, for example, by making the background color of the name label 25 green if a corresponding person is absent, white if the person is present, blue if the person is in a meeting, and the like.

Figure 6:
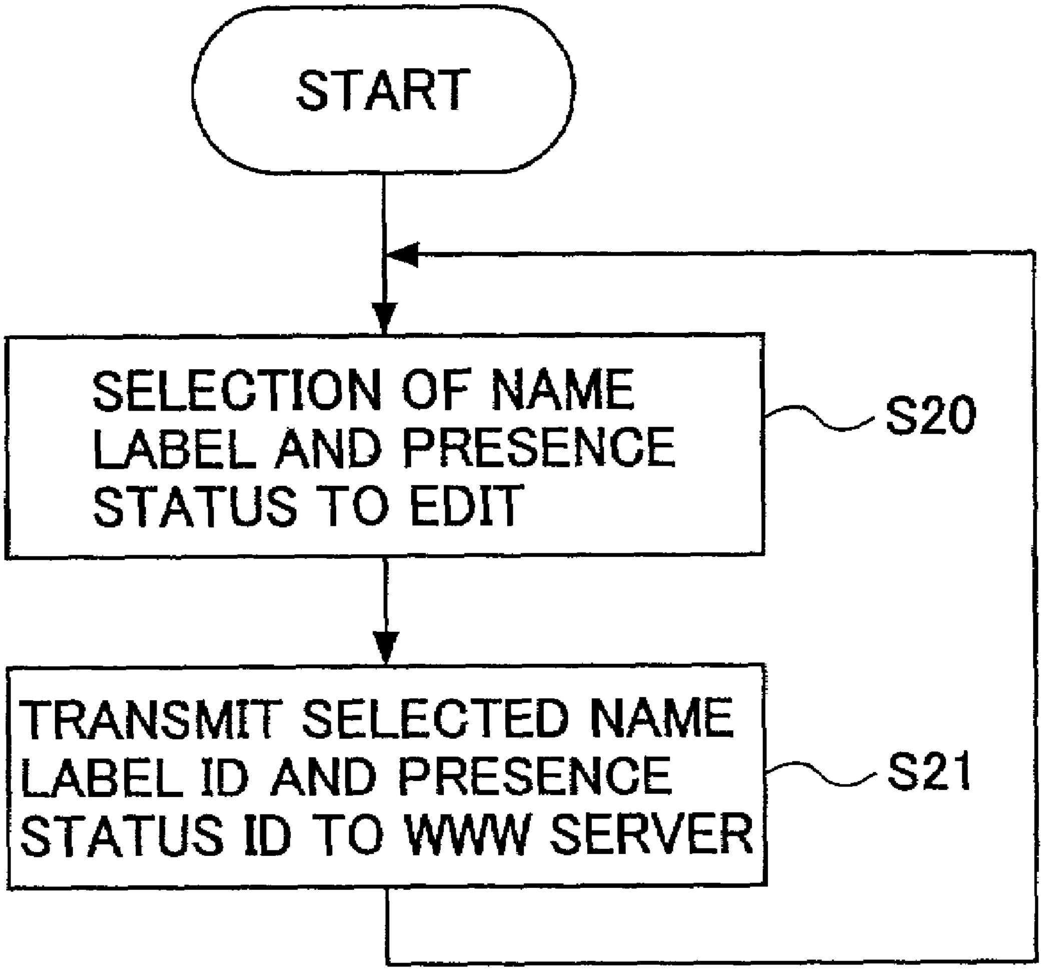
FIG. 6 is a flowchart of an example of a presence status updating process of the information-display terminal of the present invention.

FIG. 6 shows a flowchart of an example of a presence status updating process of an information-display terminal. For example, when an operator of the information-display terminal 15*a* updates a presence status of a person whose presence status is to be displayed, the process progresses to step S20, wherein the name label 25 corresponding to the person whose presence status is to be changed is selected on the presence status screen 20, and the presence status in the presence status box 22 is changed. Progressing to step S21 following step S20, the information-display terminal 15*a* transmits the name label ID and the presence status ID of the selected name label 25 to the WWW server 11. More details about the name label ID and the presence status ID will be provided later.

Figure 7:
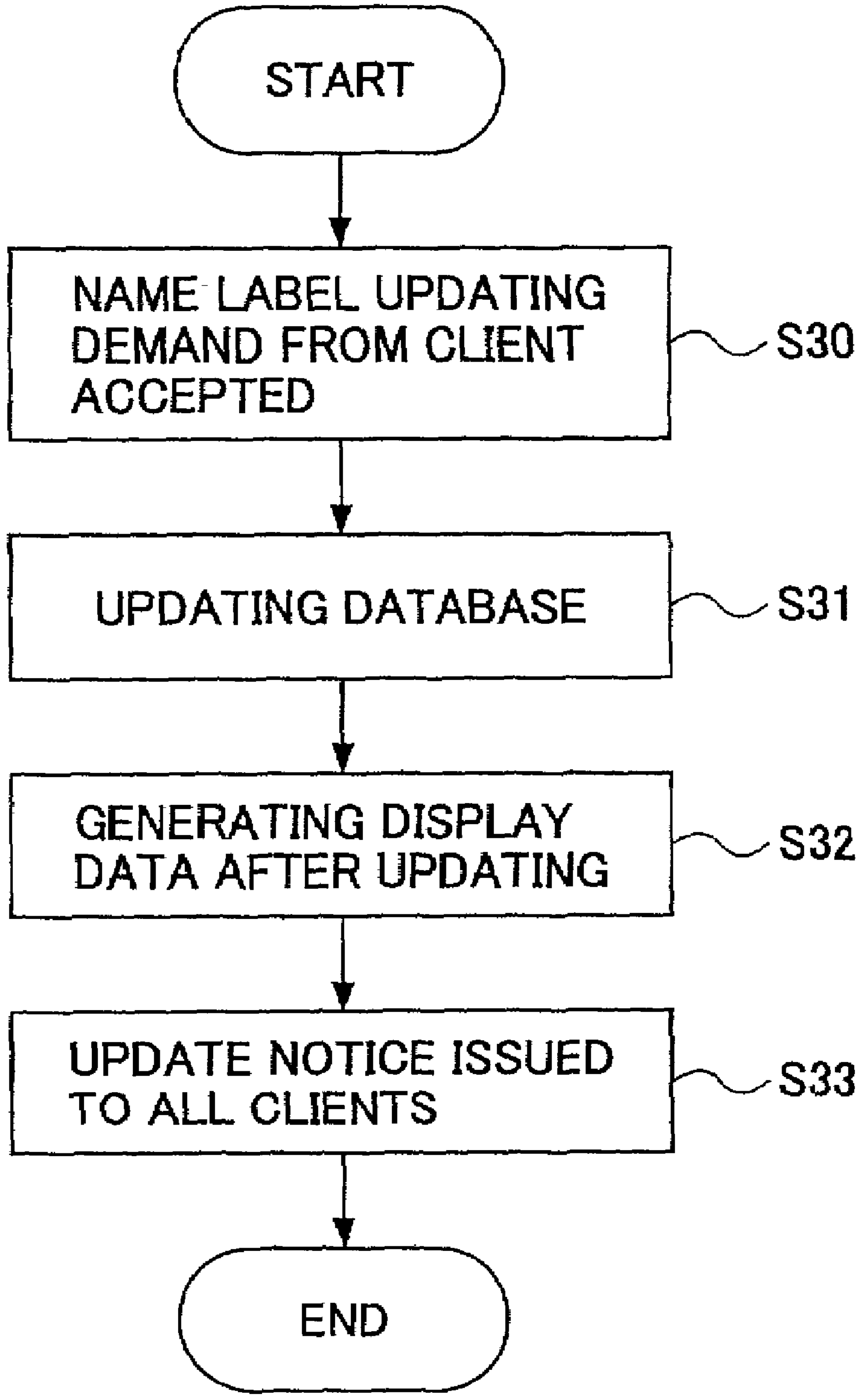
FIG. 7 is a flowchart of an example of a presence status updating process of the information-display server of the present invention.

FIG. 7 shows a flowchart of an example of a presence status updating process of the information-display server 10. At step S30, the WWW server 11, for example, receives a presence status updating demand from the information-display terminal 15a in FIG. 7. Here, the updating demand of the presence status includes the name label ID and the presence status ID.

Progressing to step S31 following step S30, the WWW server 11 searches the DB server 13 for a presence status of the person, using the name label ID corresponding to the received demand for presence status updating, and updates his or her presence status based on the presence status ID.

Progressing to step S32 following step S31, the WWW server 11 prepares display data (for example, HTML-data) for displaying the name label 25 according to the presence status of the corresponding person after updating. The display data may be prepared in advance, or alternatively, the WWW server 11 may generate the display data for displaying the name label 25 according to the presence status demand from the information-display terminal 15a. Progressing to step S33 following step S32, the WWW server 11 directs the event server 12 to send a notice that there is an update of a presence status. The event server 12 transmits the notice that there is an update of a presence status to all the information-display terminals 15a–15n according to the direction of the WWW server 11.

Figure 8:
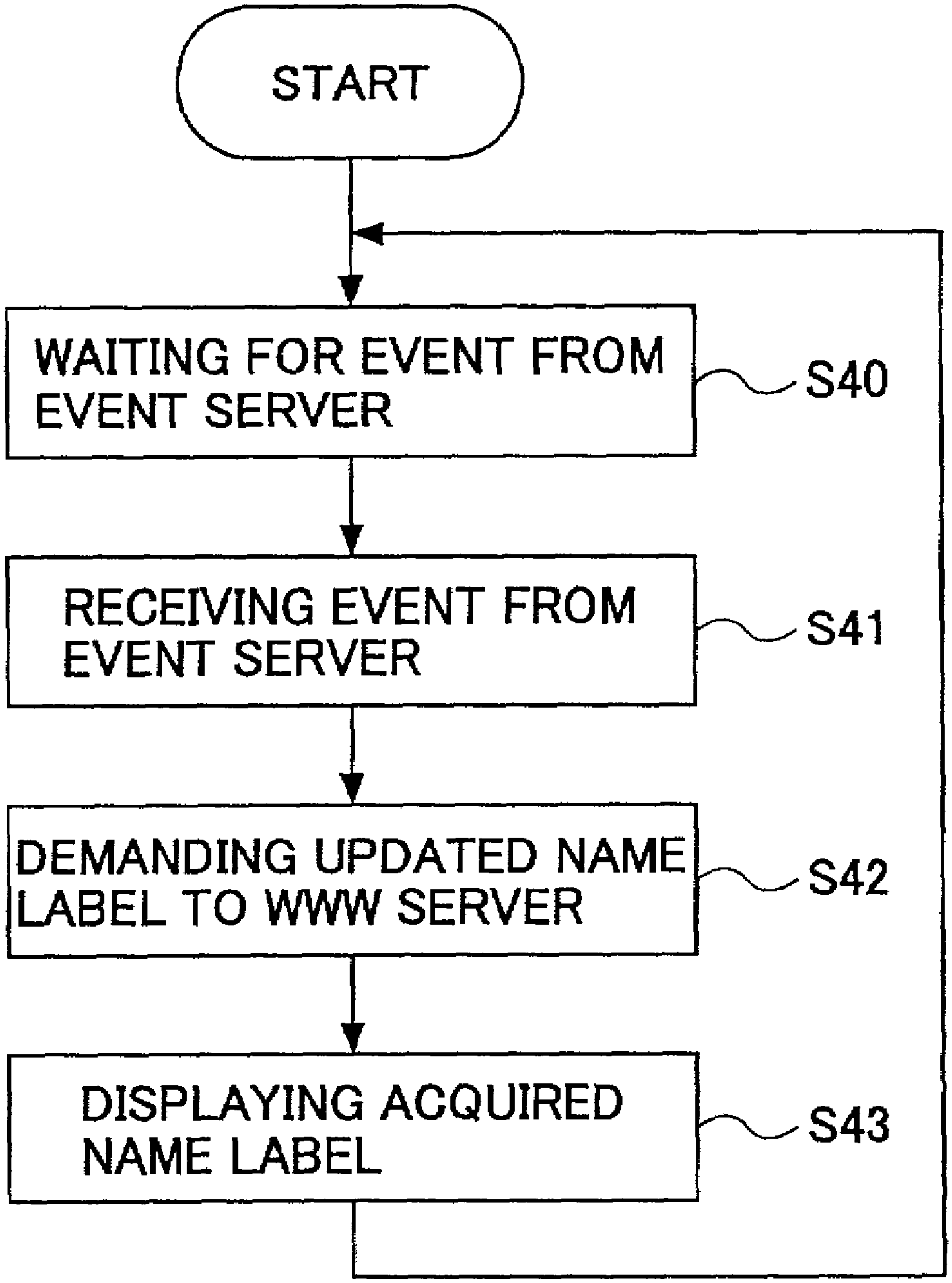
FIG. 8 is a flowchart of an example of a display information updating process of the information-display terminal of the present invention.

FIG. 8 shows a flowchart of an example of a display information updating process of the display terminal. In FIG. 8, at step S40, the information-display terminal 15a is waiting for a notice that there is an update of a presence status from the event server 12. Progressing to step S41 following step S40, the information-display terminal 15a receives the notice that there is an update of a presence status from the event server 12.

Progressing to step S42 following step S41, the information-display terminal 15a demands the display data for displaying the name label 25 after the updating of the WWW server 11. Then, the process progresses to step S43 following step S42, wherein the information-display terminal 15a acquires the demanded display data from the WWW server 11, and the acquired name label 25 is displayed, for example, as shown in FIG. 4.

Figure 9:
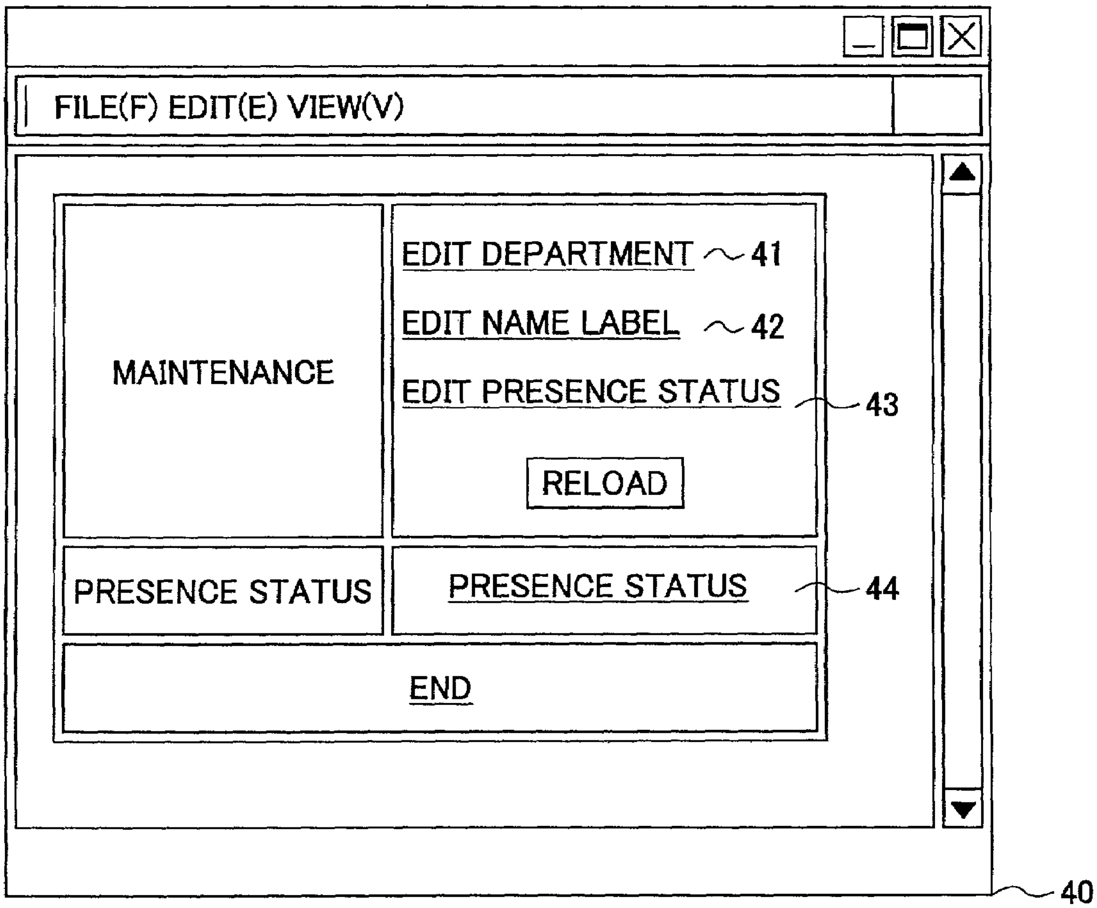
FIG. 9 is an example of a management menu screen of the present invention.

In addition, an operator who has a relatively wider access permission, for example, a manager, a general affairs person, etc., can display a management menu as shown in FIG. 9 on the information-display terminal 15a, and can maintain the information-display-system 1. FIG. 9 shows an example of a management menu screen.

Figure 10:
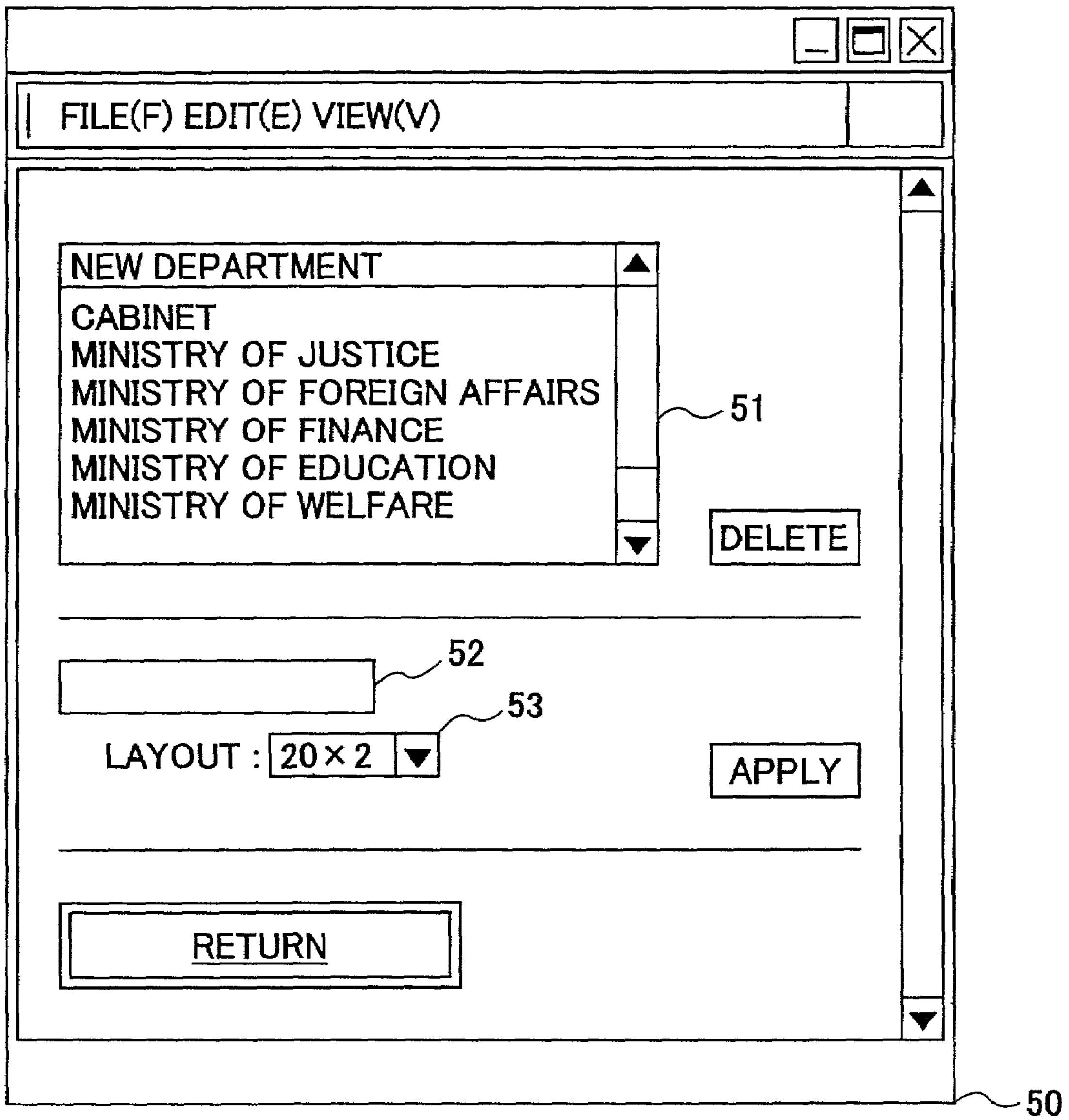
FIG. 10 is an example of a department editing screen of the present invention.
Figure 11:
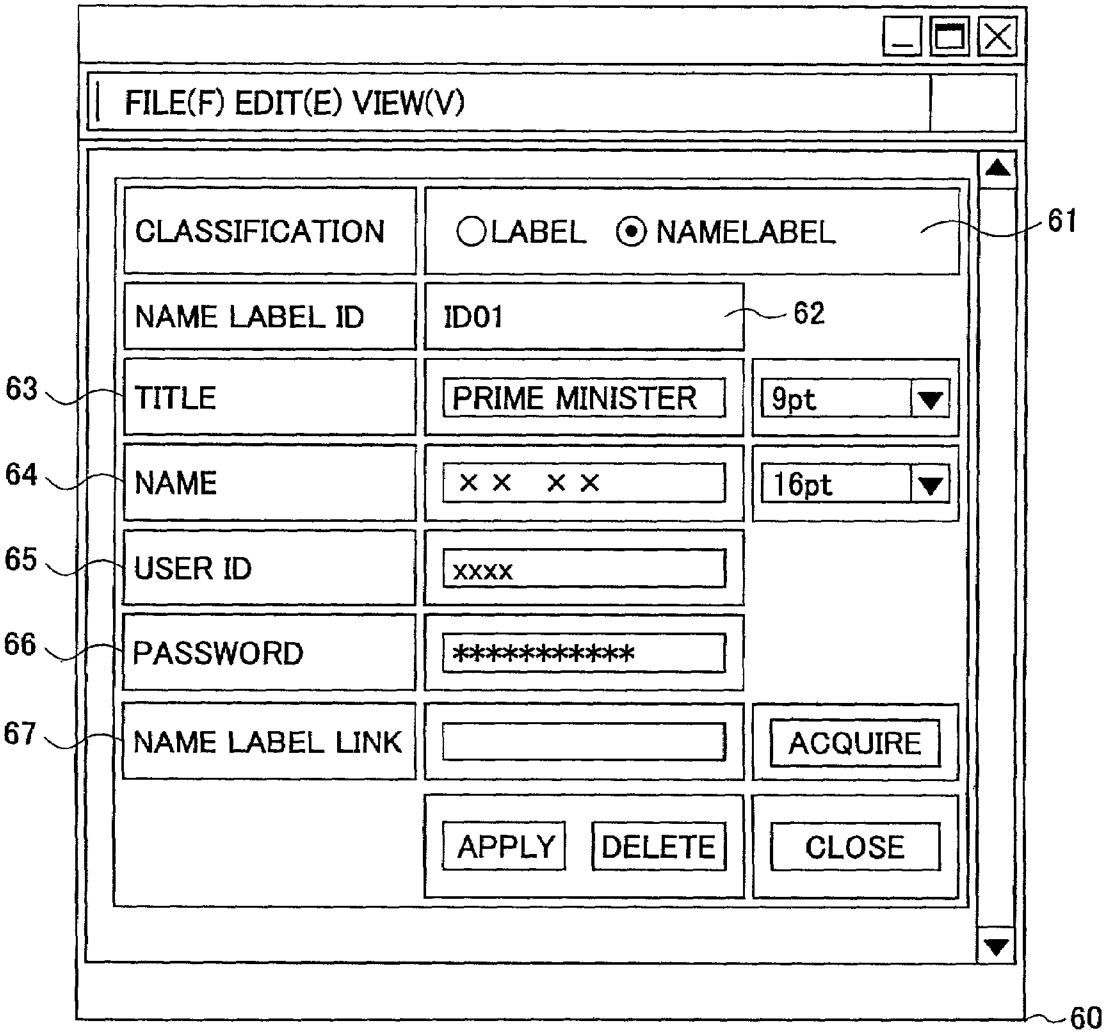
FIG. 11 is an example of a nameplate editing screen of the present invention.
Figure 12:
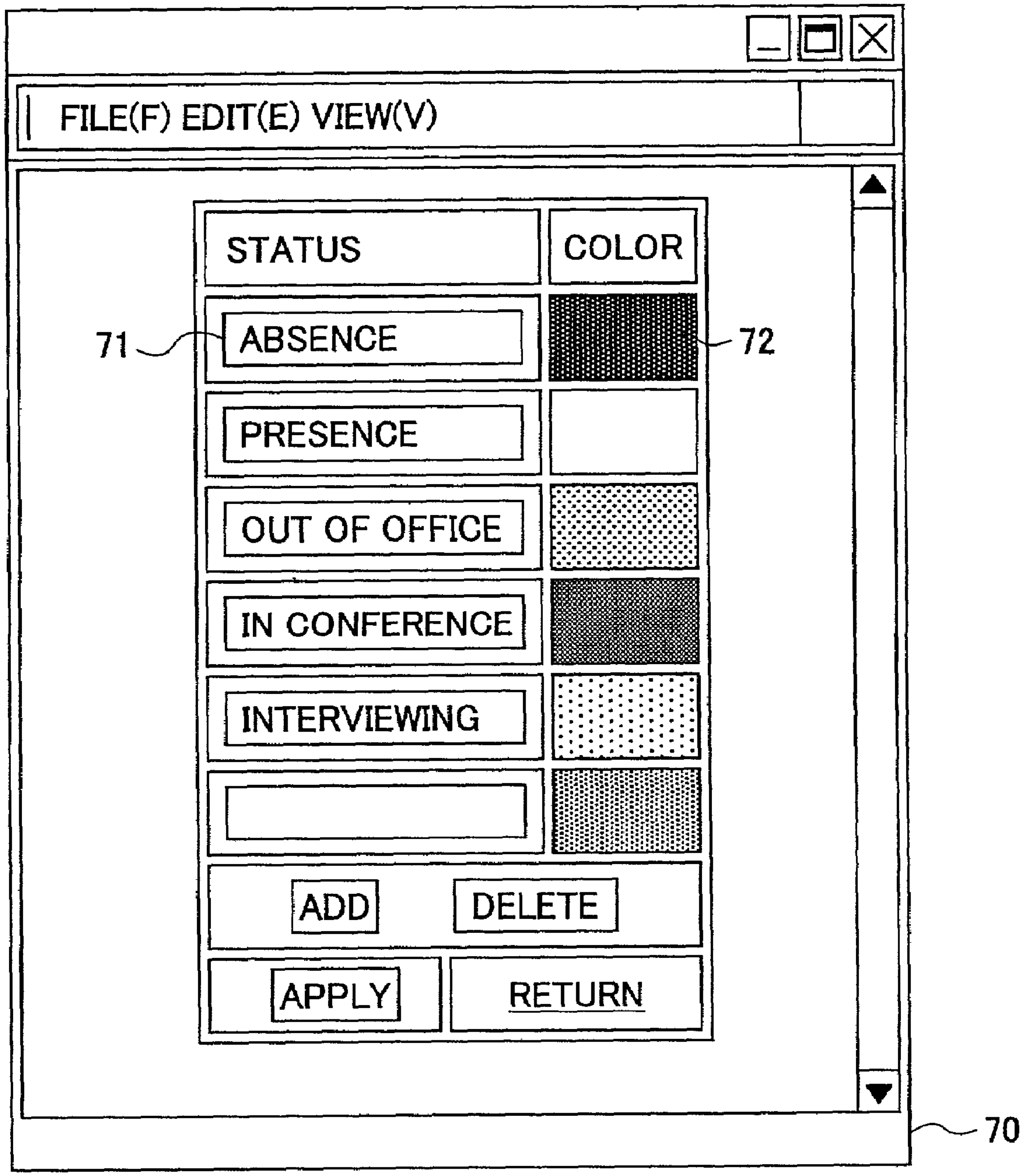
FIG. 12 is an example of a presence status editing screen of the present invention.

The management menu screen 40 of FIG. 9 includes a department edit link 41, a name label edit link 42, a presence status edit link 43, and a presence status link 44. The department edit link 41 is a link for displaying a department editing screen 50 as shown in FIG. 10 for editing department information. The name label edit link 42 is a link for displaying a name label editing screen 60 as shown in FIG. 11 for editing name label information. The presence status edit link 43 is a link for displaying a presence status editing screen 70 as shown in FIG. 12 for editing the presence status of a name label. The presence status link 44 is a link for displaying the presence status screen 20 as shown in FIG. 4.

FIG. 10 shows an example of the department editing screen. The department editing screen 50 of FIG. 10 includes a department list box 51, a department name box 52, and a layout box 53. The department list box 51 is for selecting a department of which information is to be edited. When preparing information for a new department, "New Department" is to be selected in the department list box 51.

The department name box 52 is a box for inputting a department name. The layout box 53 is for selecting a layout of the label 24 and the name label 25 contained in the presence status screen 20. For example, if a layout indicated by "20×2" in the layout box 53 is selected, the label 24 and the name label 25 are displayed in two lines, each having 20 entries like the presence status screen 20 of FIG. 4.

FIG. 11 shows an example of the name label editing screen 60. In the event that the name label edit link 42 of the management menu screen 40 is chosen, the presence status screen 20 as shown in FIG. 4, or the department menu screen 30 as shown in FIG. 5 is displayed for selection of a nameplate to be edited.

The name label editing screen 60 of FIG. 11 includes a classification selection box 61, a name label ID box 62, a title box 63, a name box 64, a user ID box 65, a password box 66, and a name label link box 67. The classification selection box 61 selects an attribute of inputs to these boxes. For example, if "Label" is selected in the classification selection box 61, the inputs are displayed like the label 24 of FIG. 4. If "Name Label" is selected in the classification selection box 61, the inputs are displayed like the name label The name label ID box 62 displays the name label ID of the name label. The title box 63 is for inputting a title for displaying on the name label. The name box 64 is for inputting a name for displaying on the name label. Here, character sizes of the name and the title displayed on a label may be selectable, respectively.

The user ID box 65 is for inputting a user ID. The password box 66 is for inputting a password. The name label link box 67 is for inputting the name label ID shared when sharing a label. Here, the sharing of the name label means a sharing of the same name label between the presence status screens of two or more departments.

FIG. 12 shows an example of the presence status editing screen 70. The presence status editing screen 70 of FIG. 12 includes a presence status box 71 and a color selection box 72. The presence status box 71 is for inputting "Present", "Absent", and the like. The presence status inputted into the presence status box 71 is displayed, for example, on the presence status box 22 of FIG. 4. The color selection box 72 is for selecting a background color of the name label 25 according to a presence status. For example, a color pallet is displayed when an operator clicks the color selection box 72 with a mouse, etc. By choosing a desired color from the color pallet, background colors of the name label 25 for different presence statuses can be chosen.

Information updated by the maintenance, etc., is reflected to the information stored in the DB server 13. The DB server 13 has various databases, for example, as shown in FIG. 13.

FIG. 13 shows block diagrams of an example of databases of the DB server 13. A block diagram of an example of a display layout DB is indicated by (a) of FIG. 13. A block diagram of an example of a label information DB is indicated by (b) of FIG. 13. A block diagram of an example of a presence status DB is indicated by (c) of FIG. 13.

The display layout DB includes "department name", "line count", "box count" and the like as database items. The label information DB includes "name label ID", "classification", "title", "name" "user ID", "password", "label link", "presence status" and the like as the database items. The presence status DB includes "situation", "color" and the like as the database items.

The display layout DB is associated with the information updated, for example, by the department editing screen 50 of FIG. 10. The label information DB is associated with the information updated, for example, by the label editing screen 60 of FIG. 11. The presence status DB is associated with the information updated, for example, by the presence status editing screen 70 of FIG. 12. In addition, the label information DB is associated with one or more departments and a display position of the presence state screen.

Figure 14:
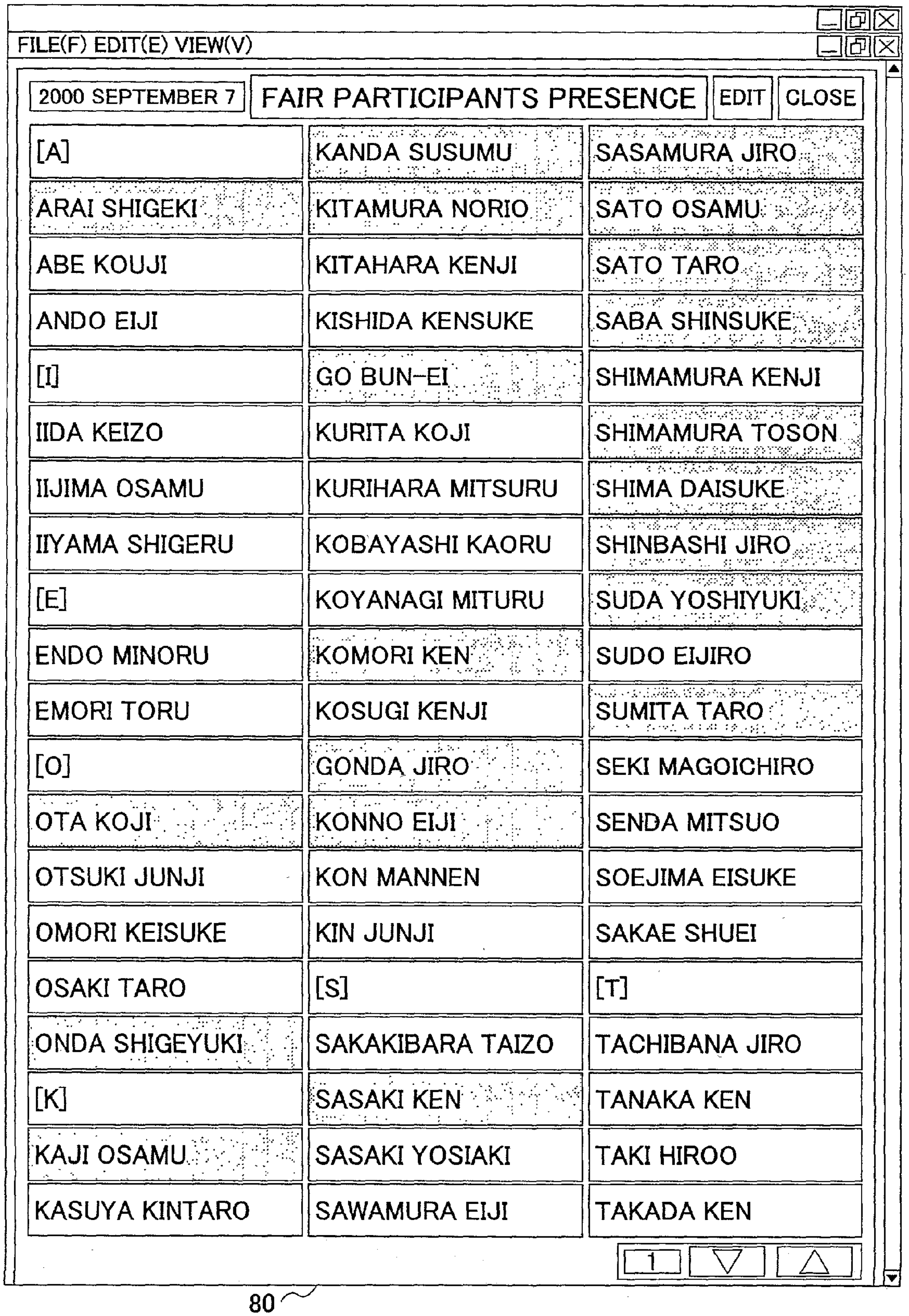
FIG. 14 is an example of an attendance situation screen of the present invention.
Figure 15:
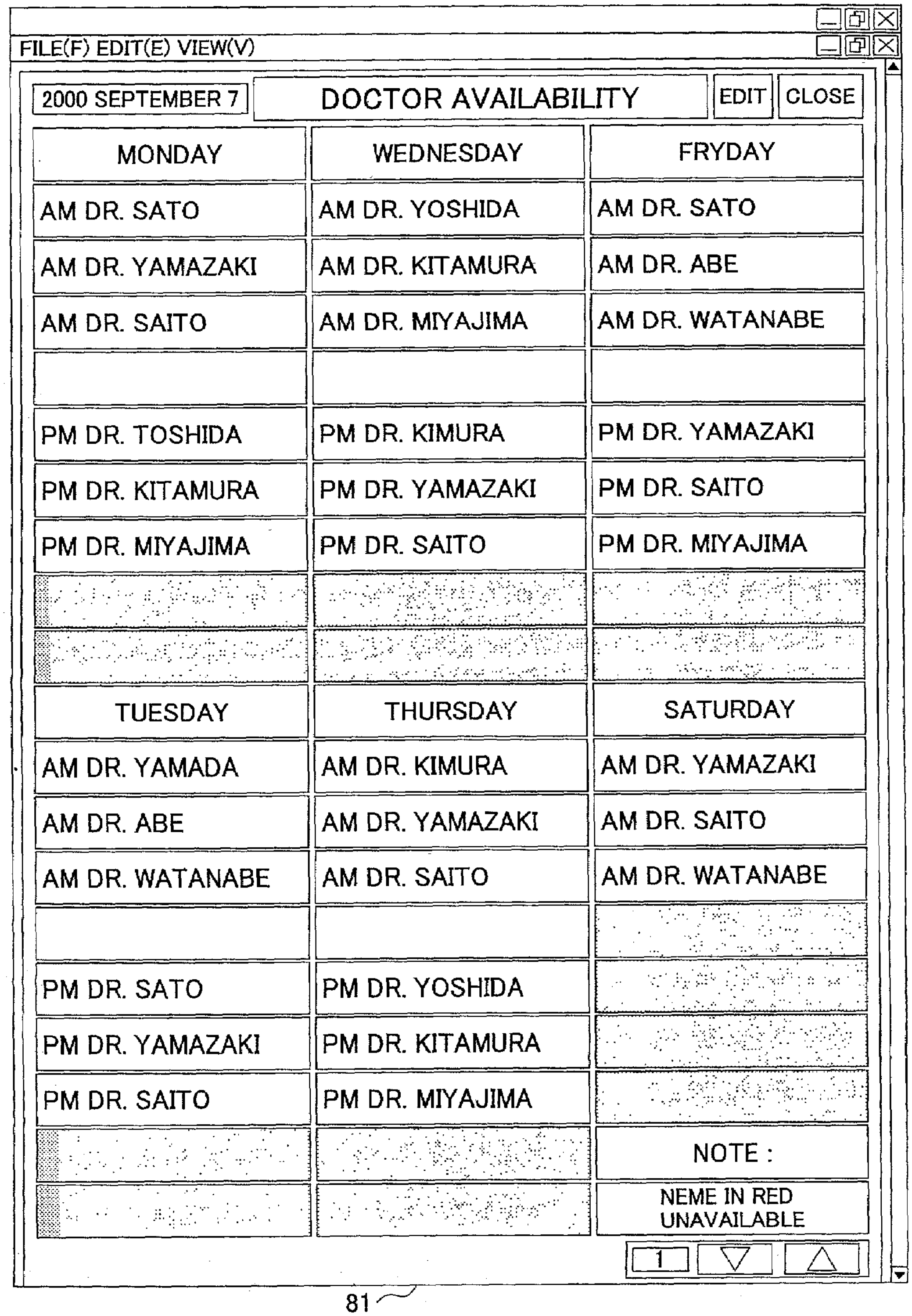
FIG. 15 is an example of a visiting doctor availability situation screen of the present invention.
Figure 16:
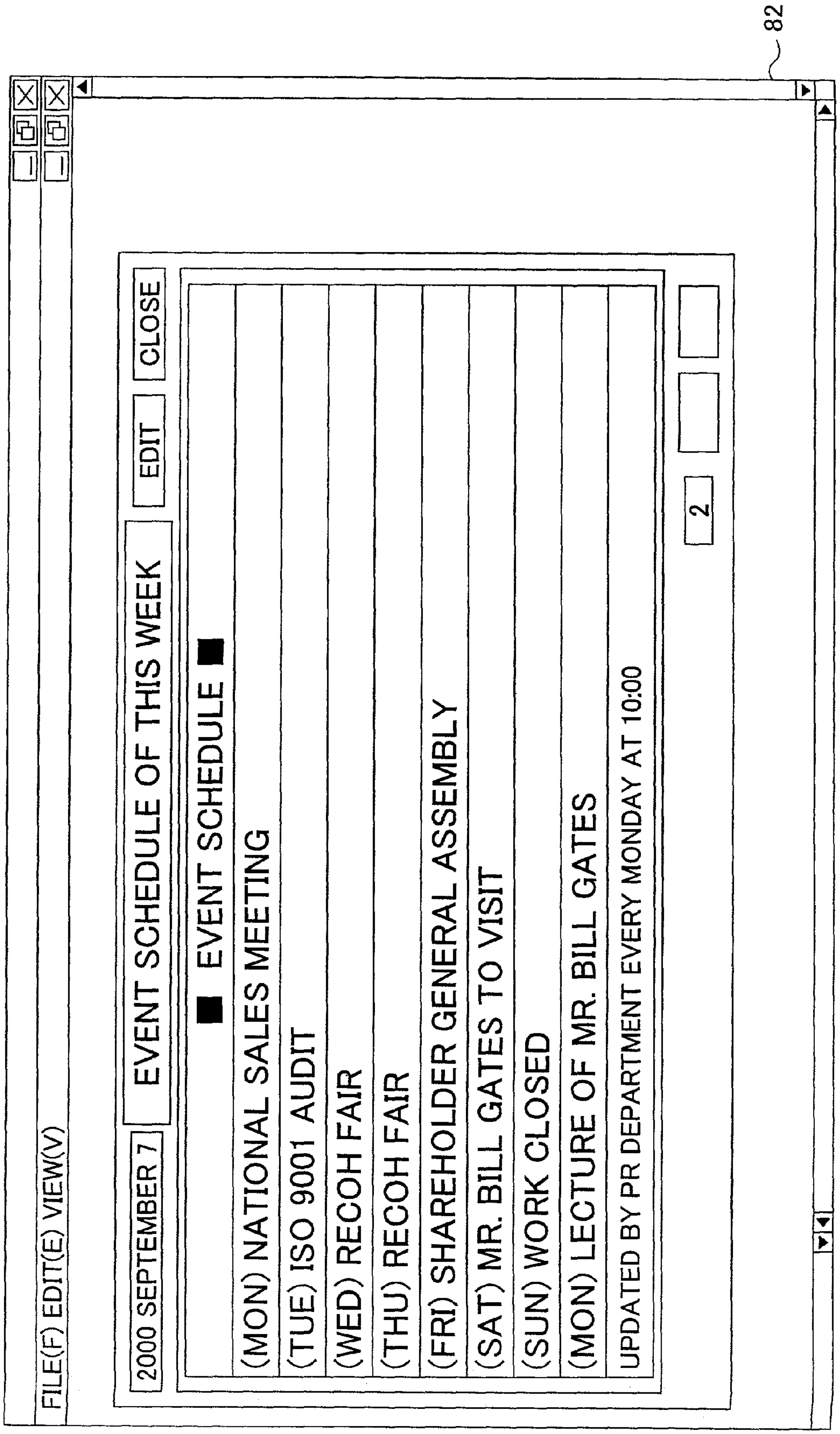
FIG. 16 is an example of an event schedule screen of the present invention.

Although the above embodiments are described along with examples that display a presence status of selected persons on an information-display terminal, the present invention can be applied to various other information display applications, including, for example, displaying an attendance situation of participants of a fair as shown in FIG. 14, displaying situations of doctors who are available for visiting patients as shown in FIG. 15, and displaying an event schedule as shown in FIG. 16, on the information-display terminals.

FIG. 14 shows an example of an attendance situation screen. The attendance situation screen 80 displays fair participants and distinguishes ones who are present from ones who are absent by differentiating the background color of name labels. FIG. 15 shows an example of a visiting doctor situation screen. The visiting doctor situation screen 81 distinguishes doctors who are available for making a house call, for example, from doctors who are unavailable by differentiating the background color of the name labels.

FIG. 16 shows an example of an event schedule screen. The event schedule screen 82 displays, for example, "The event schedule of this week" and the like. In this example, the kinds of events are displayed on the label with differentiated background colors such that the kinds are visually distinguishable.

In addition, the information-display system 1 of the present invention can be used as an attendance record by saving updated presence status records for the persons whose presence status is displayed. Moreover, by connecting the information-display system 1 to an extension telephone system, a system can be structured such that one checks whether a party to be called is present on the presence status screen 25, and the party is automatically dialed by touching the name label of the party on the presence status screen 25.

As described above, according to the present invention, as soon as information stored in the information storing means is updated, a notice that there is an update is transmitted to information-display terminals, and the information-display terminals acquire the updated information from the information-display server. That is, since the information-display terminal accesses the information-display server only when there is an update of the information stored in information storing means, network traffic is mitigated. In this manner, the information-display terminal displays current information updated in real time.

Further, the kind of information displayed on an information-display terminal can be changed easily, because the information storing means stores the information to be displayed on the information-display terminal. Moreover, maintenance and management become easy by structuring the information-display system with an information-display server and one or more information-display terminals connected via a network.

According to the present invention, the information stored in the information storing means can be updated by an updating demand from an information-display terminal. When the information stored in the information storing means is updated, the information-display server transmits a notice that there is an update to information-display terminals. Therefore, the information-display terminals can be updated in real time such that updated current information is displayed.

According to the present invention, the information-display terminal can display status of one or more persons, the status being the information to be displayed.

According to the present invention, one or more pieces of layout information are provided for displaying status of one or more persons on the information-display terminals. In this manner, display layout can be modified easily. By using the layout information, status of one or more persons in a predetermined group can be displayed on the information-display terminals.

Further, according to the present invention, the status of the person or persons can be visually distinguished by displaying each person in a specific area, and assigning specific colors for different statuses.

According to the present invention, an information-display terminal can display at least a presence or absence of a person or persons.

Further, the present invention is not limited to these embodiments, but various variations and modifications may be made without departing from the scope of the present invention.

Specifically, displaying a presence status of office personnel is described as an example. However, any desired information may be displayed.

The present application is based on Japanese priority application No. 2001-079474 filed on Mar. 19, 2001, with the Japanese Patent Office, the entire contents of which are hereby incorporated by reference.

What is claimed is:

1. An information-display system that displays information, using one or more information-display terminals and an information-display server connected to the information-display terminals though a network, each of the information-display terminals being allocated to a predetermined person, comprising:

information storing means provided in the information-display server for storing information to be displayed on the information-display terminals, the information including status information relative to the one or more predetermined persons, said status information indicating "presence" and "absence" of the predetermined persons, update notice transmitting means provided in the information-display server for transmitting a notice that there is an update of the information stored in the information storing means to the information-display terminals when the information is updated, and information acquisition and display means provided in each of the information-display terminals for acquiring automatically the updated information from the information-display server in response to the notice from the information-display server that there is an update, and for displaying the updated information, wherein different access permissions are assigned respectively to categories comprising viewers, receptionists, switchers, general affairs persons and users, and wherein viewers can peruse a presence status, receptionists can peruse and update "absence" and "presence" of persons whose presence status is to be displayed, switchers can update presence status comprising "absence", "presence", "out of office", "in a conference", and "in a meeting", general affairs persons can edit information about persons whose presence status is to be displayed, and users can peruse and update presence status of one or more specific persons whose presence status includes "absence", "presence", "out of office", "in a conference", and "in a meeting".

2. The information-display system as claimed in claim 1, wherein the information storing means stores at least one piece of personal information relative to the one or more persons whose status is to be displayed, status information relative to the one or persons whose status is to be displayed, and at least one set of layout information for aligning a display screen for the one or more persons whose status is to be displayed and their respective status on the information-display terminal.

3. The information-display system as claimed in claim 2, wherein the information-display terminal displays the status information of the one or more persons whose status is to be displayed in an area specific to each of the persons, and the area is provided with different colors according to different statuses indicated by the status information.

4. The information-display system as claimed in claim 1, further comprising:

update demanding means provided in each of the information-display terminals for demanding an update of the information stored in the information-display server, and information updating means provided in the information-display server for updating the information stored in the information storing means according to the update demand from one of the information-display terminals.

5. An information-display method for displaying information, using one or more information-display terminals and an information-display server connected to the information-display terminals through a network, each of the information-display terminals being allocated to a predetermined person, comprising:

an update notice transmitting step for transmitting from the information-display server to the information-display terminals a notice that there is an update of information when there is an update of the information stored in information storing means and an information acquisition and display step for acquiring automatically updated information from the information-display server in response to a notice from the information-display server that there is an update, and for displaying the updated information, with corresponding name labels of one or more predetermined persons on a presence status screen, wherein different access permissions are assigned respectively to categories comprising viewers, receptionists, switchers, general affairs persons and users, and wherein viewers can peruse a presence status, receptionists can peruse and update "absence" and "presence" of persons whose presence status is to be displayed, switchers can update presence status comprising "absence", "presence", "out of office", "in a conference", and "in a meeting", general affairs persons can edit information about persons whose presence status is to be displayed, and users can peruse and update presence status of one or more specific persons whose presence status includes "absence", "presence", "out of office", "in a conference", and "in a meeting".

6. An information-display server for use in the information-display system as claimed in claim 1, connected to one or more information-display terminals through a network for displaying information on the information-display terminals, comprising:

information storing means for storing information to be displayed on the information-display terminals, update notice transmitting means for transmitting to the information-display terminals a notice that there is an update when there is an update of the information stored in the information storing means, and updated information transmitting means for transmitting the updated information to be information-display terminals pursuant to a demand from one of the information-display terminals such that the information -display terminals display updated current information.

7. A computer-readable recording medium having a program recorded therein that allows a computer to:

store information to be displayed on one or more information-display terminals connected through a network, each of the information-display terminals being allocated to a predetermined person, transmit to the information-display terminals a notice that there is an update when there is an update of the information stored in an information storing means, said information including status information relative to the one or more predetermined persons, said status information indicating "presence" or "absence" of the predetermined persons, and transmit to the information-display terminals the updated information that is updated pursuant to a demand for the updated information from one of the information-display terminals such that the information-display terminals display updated current information, wherein different access permissions are assigned respectively to categories comprising viewers, receptionists, switchers, general affairs persons and users, and wherein viewers can peruse a presence status, receptionists can peruse and update "absence" and "presence" of persons whose presence status is to be displayed.

switchers can update presence status comprising "absence", "presence", "out of office", "in a conference", and "in a meeting", general affairs persons can edit information about persons whose presence status is to be displayed, and users can peruse and update presence status of one or more specific persons whose presence status includes "absence", "presence", "out of office", "in a conference", and "in a meeting".

* * * * *